United States Patent
Ahn et al.

(10) Patent No.: US 9,542,008 B2
(45) Date of Patent: Jan. 10, 2017

(54) IMAGE DISPLAY APPARATUS AND METHOD FOR OPERATING THE SAME

(71) Applicant: LG ELECTRONICS INC., Seoul (KR)

(72) Inventors: Yongki Ahn, Seoul (KR); Myungjae Jo, Seoul (KR); Kubong Min, Seoul (KR)

(73) Assignee: LG ELECTRONICS INC., Seoul (KR)

(*) Notice: Subject to any disclaimer, the term of this patent is extended or adjusted under 35 U.S.C. 154(b) by 226 days.

(21) Appl. No.: 13/741,461

(22) Filed: Jan. 15, 2013

(65) Prior Publication Data

US 2014/0022166 A1    Jan. 23, 2014

Related U.S. Application Data

(60) Provisional application No. 61/587,083, filed on Jan. 16, 2012.

(51) Int. Cl.
| | |
|---|---|
| *G06F 3/033* | (2013.01) |
| *G06F 3/038* | (2013.01) |
| *G06F 3/0485* | (2013.01) |
| *G06F 3/0362* | (2013.01) |
| *H04N 21/422* | (2011.01) |

(52) U.S. Cl.
CPC ............... *G06F 3/033* (2013.01); *G06F 3/038* (2013.01); *G06F 3/0362* (2013.01); *G06F 3/0485* (2013.01); *H04N 21/42222* (2013.01)

(58) Field of Classification Search
CPC ............ G06F 3/00; G06F 3/033; G06F 3/038; G06F 3/0485; G06F 3/0362; G09G 5/08; H04N 21/42222

USPC ......... 715/243, 784, 786, 856; 345/157–159, 345/163
See application file for complete search history.

(56) References Cited

U.S. PATENT DOCUMENTS

| | | | |
|---|---|---|---|
| 6,856,326 B1 | 2/2005 | Zhai | 345/684 |
| 2002/0033803 A1* | 3/2002 | Holzrichter | G06F 3/012 345/158 |
| 2002/0118168 A1* | 8/2002 | Hinckley | G06F 3/03543 345/163 |
| 2006/0059436 A1* | 3/2006 | Nurmi | G06F 3/04855 715/786 |
| 2009/0100373 A1 | 4/2009 | Pixley et al. | 715/786 |
| 2010/0321294 A1* | 12/2010 | Pearce | G06F 3/03545 345/158 |
| 2011/0119578 A1 | 5/2011 | Schwartz | 715/702 |

FOREIGN PATENT DOCUMENTS

WO    WO 2008/016794 A2    2/2008

OTHER PUBLICATIONS

European Search Report dated May 21, 2013 issued in Application No. 13 00 0196.

* cited by examiner

*Primary Examiner* — Lun-Yi Lao
*Assistant Examiner* — Johny Lau
(74) *Attorney, Agent, or Firm* — Ked & Associates, LLP

(57) ABSTRACT

An image display apparatus and a method for operating the same are disclosed. The method for operating an image display apparatus includes displaying an image of specific content, receiving a wheel input from an input device, moving a screen or an object within the screen according to the wheel input, and displaying the moved screen or object. A distance for which the screen or the object within the screen moves according to the wheel input is changed based on the displayed content.

14 Claims, 23 Drawing Sheets

FIG. 1
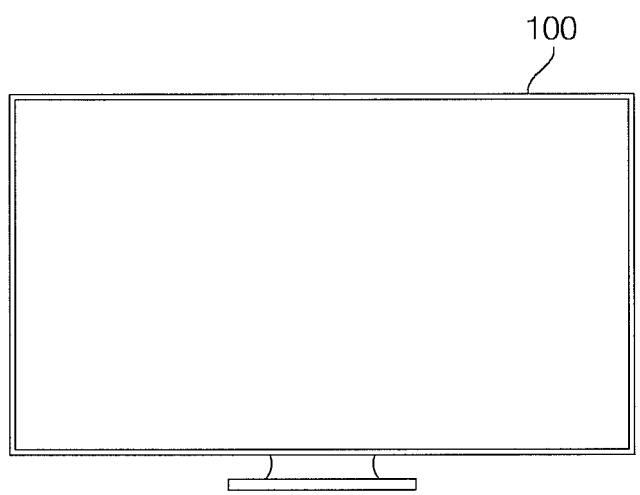
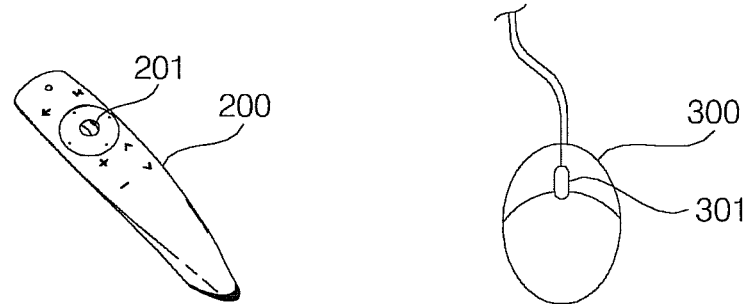

FIG. 9B
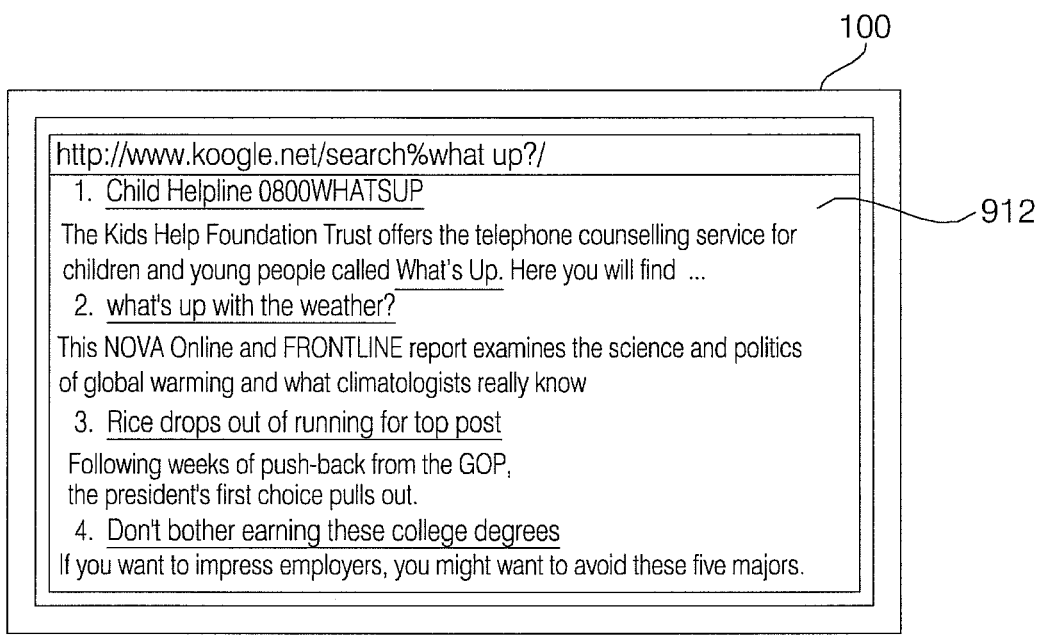
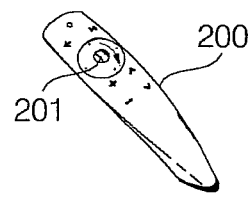

FIG. 10B
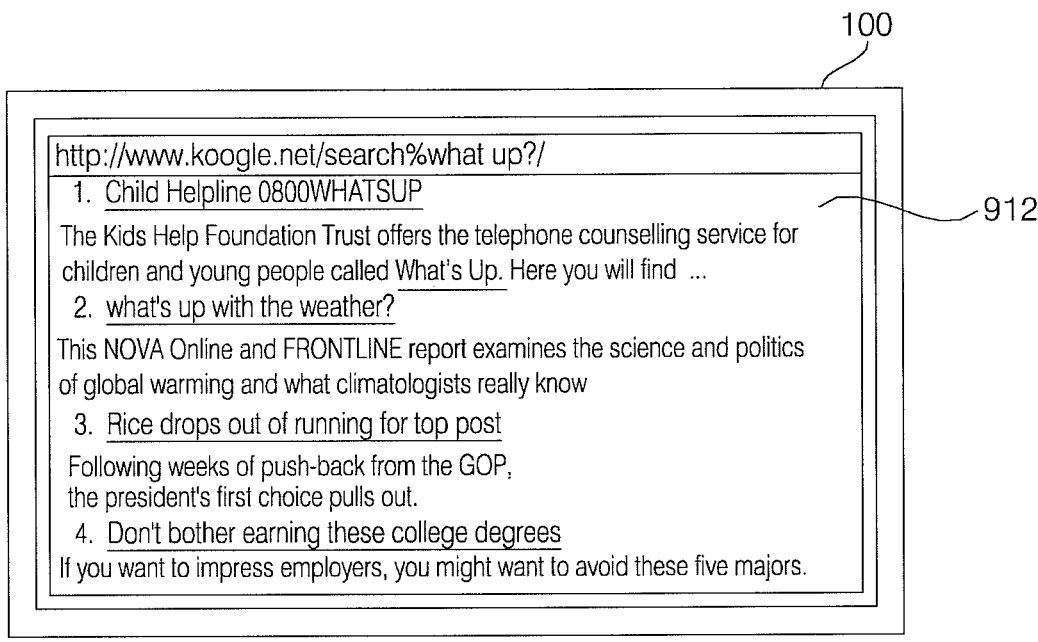
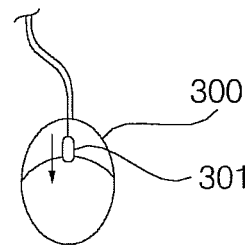

FIG. 11B
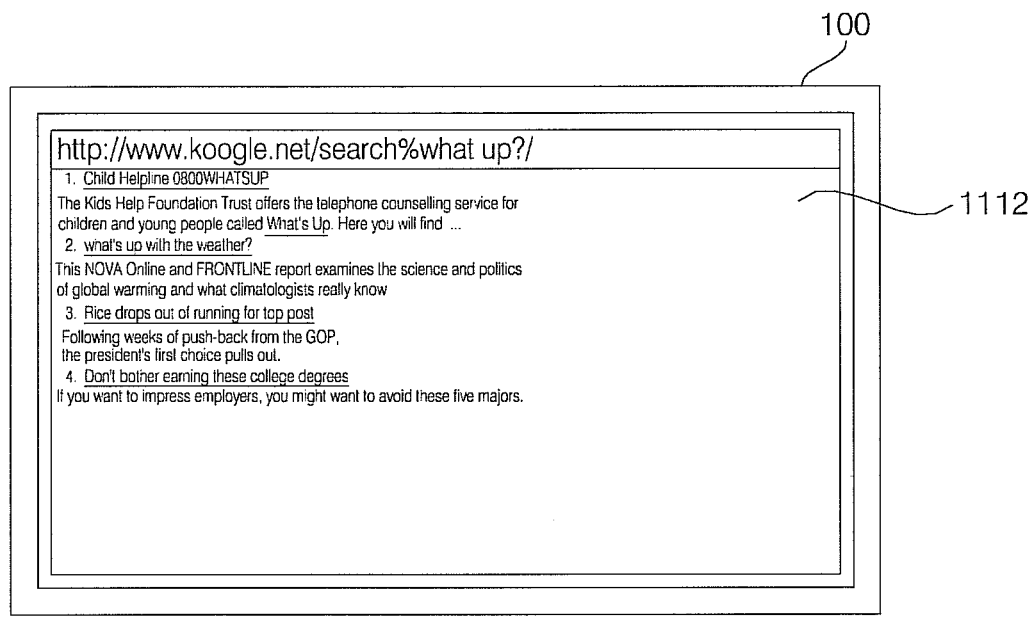
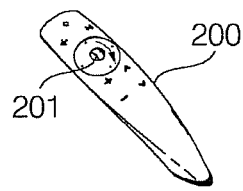

FIG. 11D
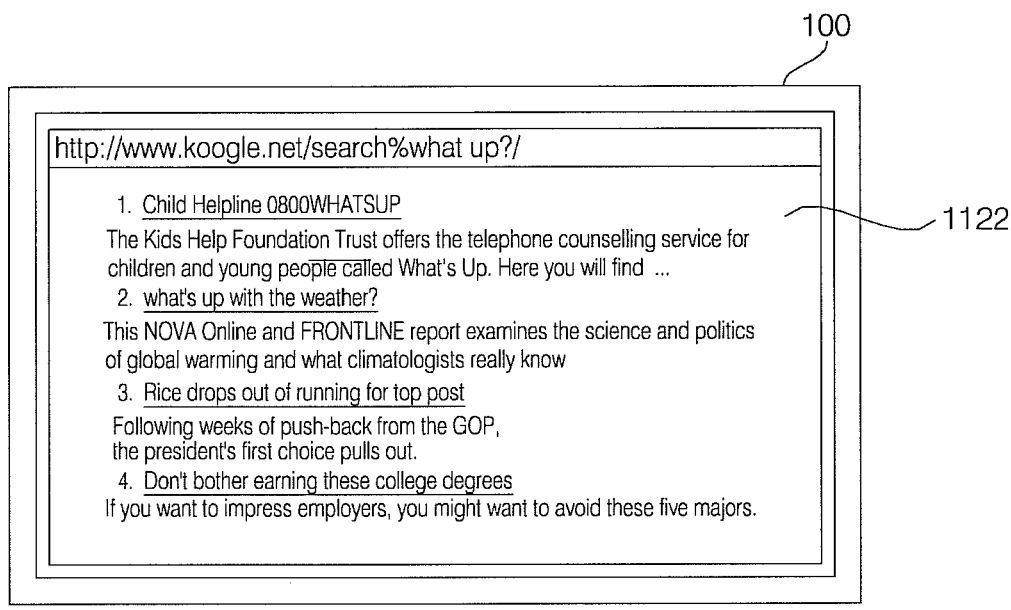
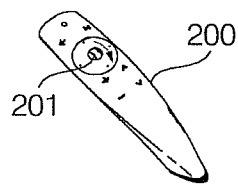

FIG. 14A
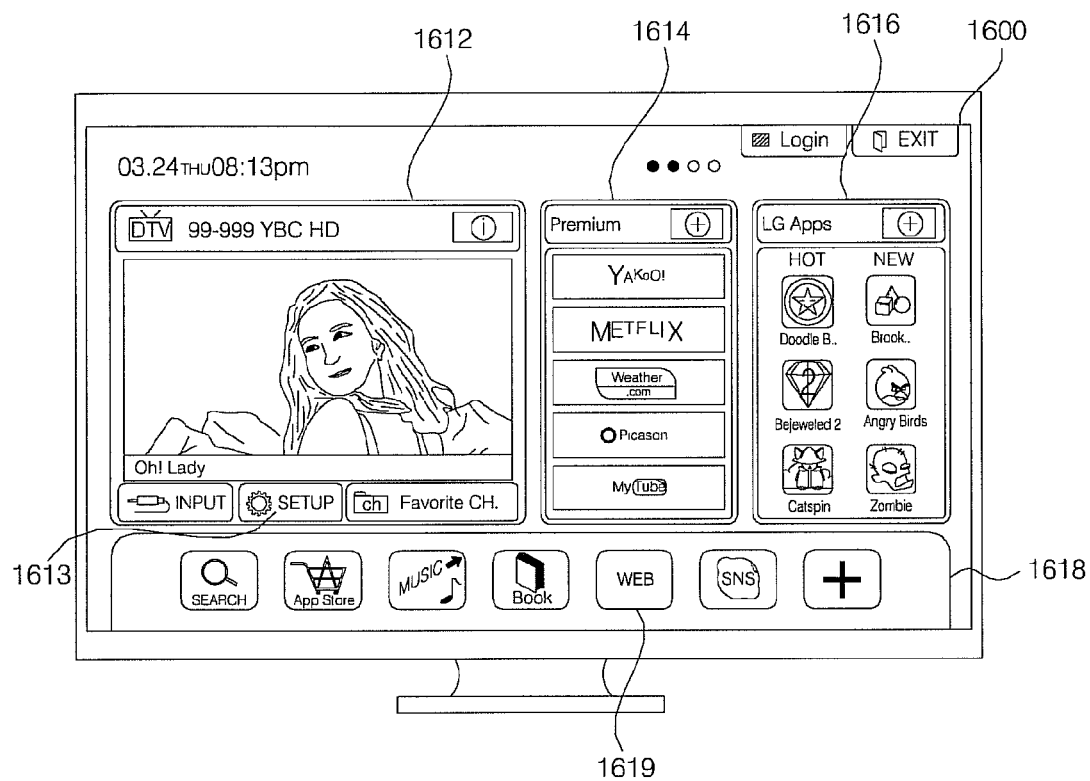
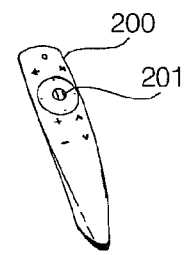

FIG. 14B
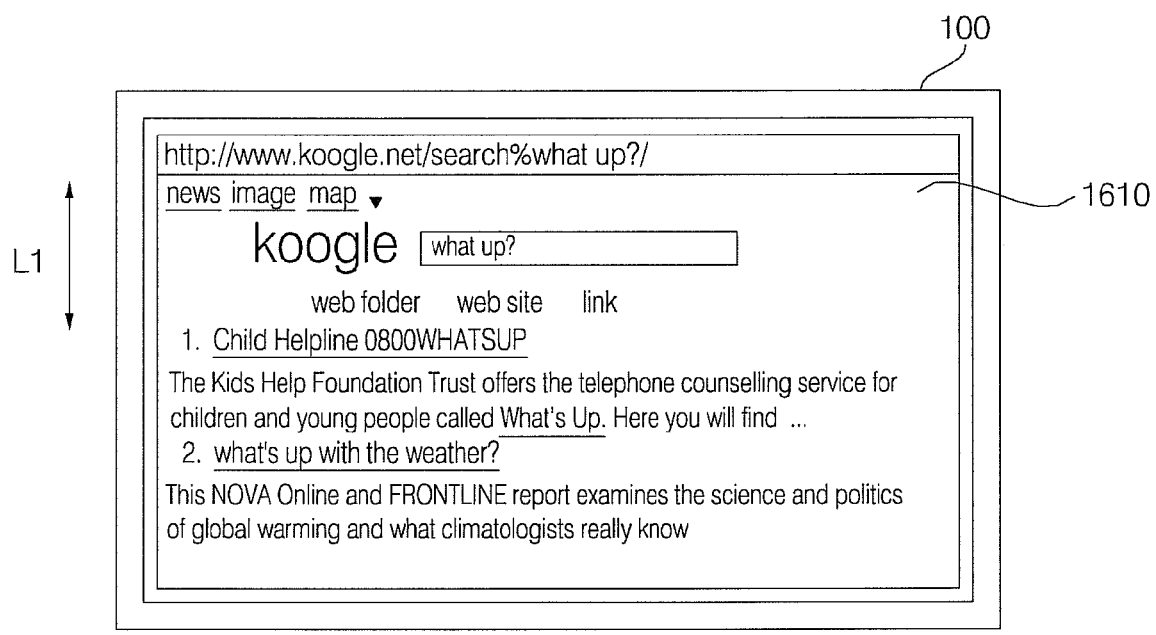
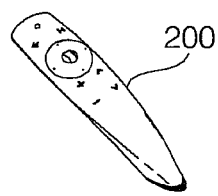

FIG. 14C
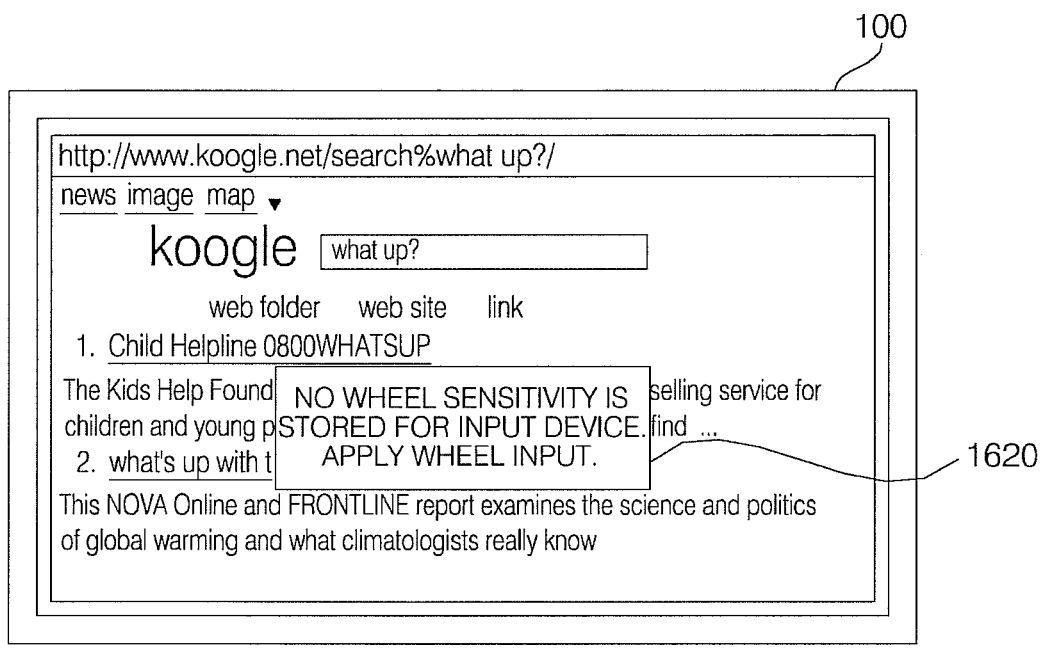
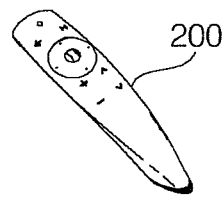

FIG. 14D
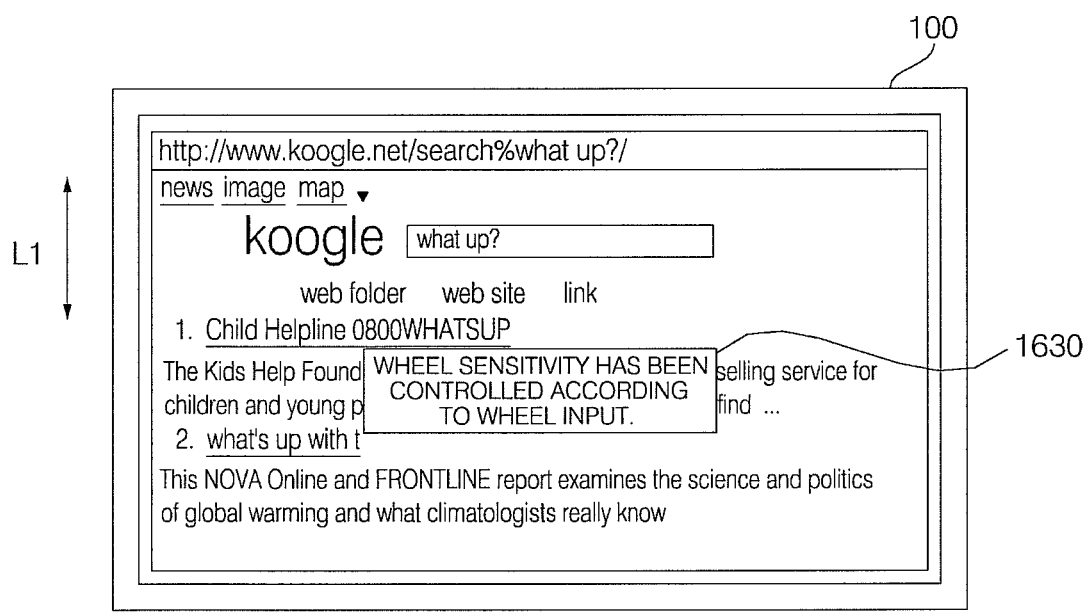
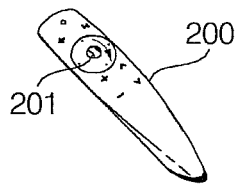

FIG. 14E
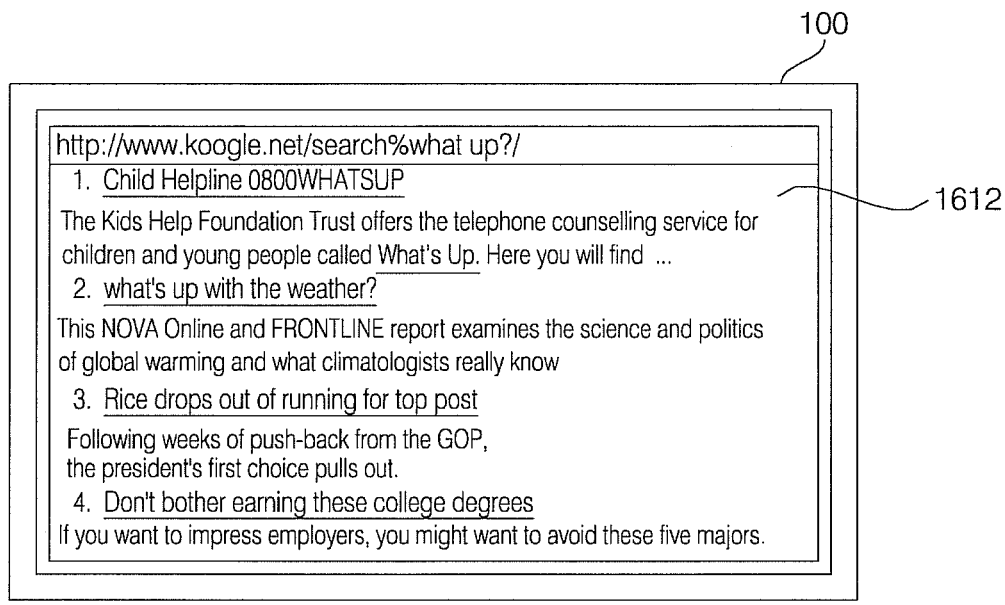
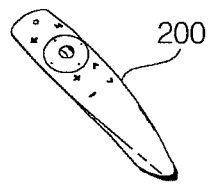

IMAGE DISPLAY APPARATUS AND METHOD FOR OPERATING THE SAME

CROSS-REFERENCE TO RELATED APPLICATION

This application claims the benefit of U.S. Provisional Patent Application No. 61/587,083, filed on Jan. 16, 2012 in the USPTO, the disclosure of which is incorporated herein by reference.

BACKGROUND OF THE INVENTION

1. Field of the Invention

The present invention relates to an image display apparatus and a method for operating the same, and more particularly, to an image display apparatus and a method for operating the same, which can increase user convenience.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which can increase user convenience.

It is another object of the present invention to provide an image display apparatus and a method for operating the same, which can change a wheel input-based movement distance according to the type of displayed content, when a wheel input is applied through an input device.

In accordance with an aspect of the present invention, the above and other objects can be accomplished by the provision of a method for operating an image display apparatus, including displaying an image of specific content, receiving a wheel input from an input device, moving a screen or an object within the screen according to the wheel input, and displaying the moved screen or object. A distance for which the screen or the object within the screen moves according to the wheel input is changed based on the displayed content.

In accordance with another aspect of the present invention, there is provided an image display apparatus including a display to display an image of specific content, an interface to receive a wheel input from an input device, and a controller to control movement of a screen or an object within the screen according to the wheel input and to control display of the moved screen or object. The controller changes a distance for which the screen or the object within the screen moves according to the wheel input, based on the displayed content.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates an image display apparatus and input devices according to an embodiment of the present invention;

FIGS. 13 to 14E are views referred to for describing the method for operating the image display apparatus illustrated in FIG. 12.

DETAILED DESCRIPTION OF THE PREFERRED EMBODIMENTS

Figure 2:
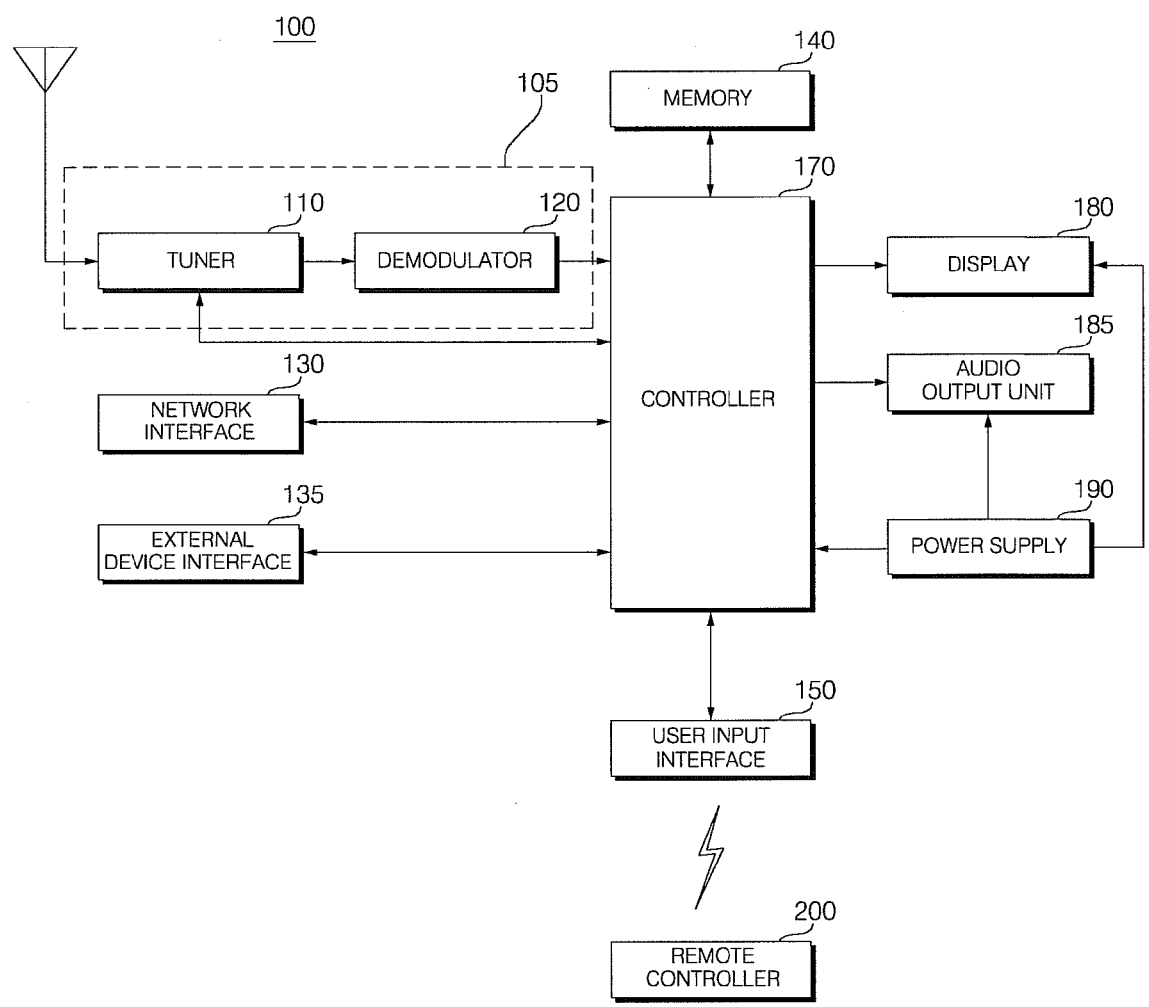
FIG. 2 is a block diagram of the image display apparatus illustrated in FIG. 1.

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

An image display apparatus as set forth herein is an intelligent image display apparatus equipped with a computer support function in addition to a broadcast reception function. Thus the image display apparatus may have user-friendly interfaces such as a handwriting input device, a touch screen, or a three-dimensional (3D) pointing device. Further, because the image display apparatus supports wired or wireless Internet, it is capable of e-mail transmission/reception, Web browsing, banking, gaming, etc. by connecting to the Internet or a computer. To implement these functions, the image display apparatus may operate based on a standard general-purpose Operating System (OS).

That is, various applications can be freely added to or deleted from a general-purpose OS kernel in the image display apparatus according to the present invention. Therefore, the image display apparatus may perform a number of user-friendly functions. The image display apparatus may be, for example, a smart TV.

FIG. 1 illustrates an image display apparatus and input devices according to an embodiment of the present invention.

Referring to FIG. 1, an image display apparatus 100 may operate according to an input received from a first input device 200 or a second input device 300.

For example, the first input device 200 being a remote controller may power on the image display apparatus 100 or may control the channel switching and sound volume of the image display apparatus 100. A pointer may be displayed on the image display apparatus 100 in correspondence with movement of the first input device 200.

If the first input device 200 has a wheel 201 as illustrated in FIG. 1, a displayed screen or an object displayed on a screen may be moved according to a wheel input in the image display apparatus 100.

Meanwhile, the second input device 300 being a mouse may display a pointer on the image display apparatus 100. A user may select an intended item in the image display apparatus 100 by moving the pointer and selecting the item using the second input device 300.

If the second input device 300 has a wheel 301 as illustrated in FIG. 1, a displayed screen or an object displayed on a screen may be moved according to a wheel input in the image display apparatus 100.

According to an embodiment of the present invention, upon receipt of a wheel input from the input device 200 or 300, the image display apparatus 100 differentiates a movement distance according to the type of displayed content in response to the wheel input.

For example, upon receipt of a wheel input from the first input device 200 while displaying a Web page or a game screen, the image display apparatus 100 may provide a first movement distance. Upon receipt of a wheel input from the first input device 200 while displaying a setting screen, the image display apparatus 100 may provide a second movement distance shorter than the first movement distance.

In this manner, a wheel input-based movement distance is changed according to the type of displayed content, thereby increasing user convenience.

According to an embodiment of the present invention, the image display apparatus 100 may set the same movement distance regarding wheel inputs from different input devices. For example, in both cases where the image display apparatus 100 receives wheel inputs from the first and second input devices 200 and 300, the image display apparatus 100 may set the same movement distances for the wheel inputs.

Specifically, irrespective of the first or second input device 200 or 300 from which the image display apparatus 100 receives a wheel input while displaying a Web page or a game screen, the image display apparatus 100 may provide the same first movement distance.

In addition, irrespective of the first or second input device 200 or 300 from which the image display apparatus 100 receives a wheel input while displaying a setting screen, the image display apparatus 100 may provide the same second movement distance.

As described above, since the same movement distance, that is, the same wheel sensitivity is set for wheel inputs from different input devices, the user is relieved of the inconvenience with which he or she might otherwise adjust wheel sensitivity due to different wheel sensitivities of different input devices whenever the user uses each input device.

Wheel input-based movement distances will be described below in greater detail with reference to FIGS. 8 to 14E.

FIG. 2 is a block diagram of the image display apparatus illustrated in FIG. 1.

Referring to FIG. 2, the image display apparatus 100 according to an embodiment of the present invention includes a broadcasting receiver 105, a network interface 130, an external device interface 135, a memory 140, a user input interface 150, a controller 170, a display 180, an audio output unit 185, and a power supply 190. The broadcasting receiver 105 may include a tuner 110 and a demodulator 120. When needed, the broadcasting receiver 105 may further include the network interface 130.

The tuner 110 selects a Radio Frequency (RF) broadcast signal corresponding to a channel selected by a user or an RF broadcast signal corresponding to each of pre-stored channels from among a plurality of RF broadcast signals received through an antenna and downconverts the selected RF broadcast signal into a digital Intermediate Frequency (IF) signal or an analog baseband Audio/Video (A/V) signal.

More specifically, if the selected RF broadcast signal is a digital broadcast signal, the tuner 110 downconverts the selected RF broadcast signal into a digital IF signal, DIF. On the other hand, if the selected RF broadcast signal is an analog broadcast signal, the tuner 110 downconverts the selected RF broadcast signal into an analog baseband A/V signal, CVBS/SIF.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The demodulator 120 receives the digital IF signal DIF from the tuner 110 and demodulates the digital IF signal DIF.

The demodulator 120 may perform demodulation and channel decoding on the digital IF signal DIF, thereby obtaining a stream signal TS. The stream signal TS may be a signal in which a video signal, an audio signal and a data signal are multiplexed.

The stream signal TS may be input to the controller 170 and thus subjected to demultiplexing and A/V signal processing. The processed video and audio signals are output to the display 180 and the audio output unit 185, respectively.

The external device interface 135 may serve as an interface between a connected external device and the image display apparatus 100. For interfacing, the external device interface 130 may include an A/V Input/Output (I/O) unit (not shown) and/or a wireless communication module (not shown).

The external device interface 130 may be connected to an external device such as a Digital Versatile Disk (DVD) player, a Blu-ray player, a game console, a camera, a camcorder, a computer (e.g., a laptop computer), or a set-top box, wirelessly or by wire. Then, the external device interface 130 may transmit and receive signals to and from the external device.

The A/V I/O unit of the external device interface 130 may receive video, audio, and/or data signals from the external device. The wireless communication module of the external device interface 130 may perform short-range wireless communication with other electronic devices.

The network interface 135 serves as an interface between the image display apparatus 100 and a wired/wireless network such as the Internet. The network interface 135 may receive content or data from the Internet, a Content Provider (CP), or a Network Provider (NP) over a network.

The network interface 130 may access a specific Web page over a connected network or another network linked to the connected network. That is, the network interface 130 may access a specific Web page over a network and may transmit data to or receive data from a server. Besides, the network interface 130 may receive content or data from a CP or an NP.

Further, the network interface 130 may selectively receive an intended application from among applications open to the public through a network.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel-add function.

The memory 140 may store an application or an application list received from the external device interface 135 or the network interface 130.

The image display apparatus 100 may open a content file (e.g. a video file, a still image file, a music file, a text file, an application file, etc.) to the user.

While the memory 140 is shown in FIG. 2 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from the remote controller 200, provide the controller 170 with user input signals received from local keys (not shown), such as inputs of a power key, a channel key, a volume key, and a setting key, transmit a control signal received from a sensor unit (not shown) for sensing a user gesture to the controller 170, or transmit a signal received from the controller 170 to the sensor unit.

The controller 170 may demultiplex the stream signal TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 2, the controller 170 may include a demultiplexer (DEMUX) and a video processor, which will be described later with reference to FIG. 3.

In addition, the controller 170 may provide overall control to the image display apparatus 100. For example, the controller 170 may control the tuner 110 to tune to an RF broadcast signal corresponding to a user-selected channel or a pre-stored channel.

The controller 170 may control the image display apparatus 100 according to a user command received through the user input interface 150 or according to an internal program. Especially, the controller 170 may connect to a network and download a user-intended application or application list to the image display apparatus 100 through the network.

For example, the controller 170 receives a signal of a channel selected according to a specific channel selection command received through the user input interface 150 by controlling the tuner 110 and processes a video, audio or data signal of the selected channel. The controller 170 outputs information about the user-selected channel along with the processed video or audio signal to the display 180 or the audio output 185.

In another example, the controller 170 outputs a video or audio signal received from an external device, for example, a camera or a camcorder according to an external device video play command received through the user input interface 150 to the display 180 or the audio output unit 185.

The controller 170 may also control the display 180 to display images. The image displayed on the display 180 may be a two-Dimensional (2D) or 3D still image or video.

The controller 170 may control a particular object in the image displayed on the display 180 to be rendered as a 3D object. For example, the particular object may be at least one of a linked Web page (e.g. of a newspaper, a magazine, etc.), an Electronic Program Guide (EPG), a menu, a widget, an icon, a still image, a video, or text.

The controller 170 may locate the user based on an image captured by a camera unit (not shown). Specifically, the controller 170 may measure the distance (a z-axis coordinate) between the user and the image display apparatus 100. In addition, the controller 170 may calculate x-axis and y-axis coordinates corresponding to the position of the user on the display 180.

Upon selection of an application view menu item, the controller 170 may control display of an application or application list that are available in the image display apparatus or can be downloaded from an external network.

The controller 170 may control installation and execution of applications downloaded from the external network as well as various User Interfaces (UIs). The controller 170 may also control display of an image related to an executed application on the display 180 according to user selection.

The display 180 generates drive signals by converting a processed video signal, a processed data signal, and an On Screen Display (OSD) signal received from the controller 170 or a video signal, a data signal, and a control signal received from the external device interface 135.

The display 180 may be various types of displays such as a Plasma Display Panel (PDP), a Liquid Crystal Display (LCD), an Organic Light-Emitting Diode (OLED) display, and a flexible display. The display 180 may also be capable of displaying 3D images.

The display 180 may also be a touch screen that can be used not only as an output device but also as an input device.

The audio output unit 185 may receive a processed audio signal from the controller 170 and output the received audio signal as voice.

The power supply 190 supplies power to the image display apparatus 100. Particularly, the power supply 190 may supply power to the controller 170, the display 180, and the audio output unit 185, which may be implemented as a System On Chip (SOC).

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For the transmission of a user input, the remote controller 200 may operate in conformance to various communication standards such as Bluetooth, RF, InfraRed (IR), Ultra WideBand (UWB), and ZigBee.

In addition, the remote controller 200 may receive a video signal, audio signal and/or data signal from the user input interface 150 and output the received signal as an image, sound, or vibrations.

The remote controller 200 may transmit coordinate information corresponding to its movement to the image display apparatus 100 so that a pointer may be displayed in correspondence with the movement of the remote controller 200 on the display 180 of the image display apparatus 100. Since a pointer is displayed at a shifted position according to movement in a 3D space, the remote controller 200 may be referred to as a 3D pointing device.

The block diagram of the image display apparatus 100 illustrated in FIG. 2 is an exemplary embodiment of the present invention. The image display apparatus 100 is shown in FIG. 2 as having a number of components in a given configuration. However, the image display apparatus 100 may include fewer components or more components than those shown in FIG. 2 in alternative embodiments. Also, two or more components of the image display apparatus 100 may be combined into a single component or a single component thereof may be separated into two more components in alternative embodiments. The functions of the components of the image display apparatus 100 as set forth herein are illustrative in nature and may be modified, for example, to meet the requirements of a given application.

Unlike the configuration illustrated in FIG. 2, the image display apparatus 100 may be configured so as to receive and playback a broadcast video through the network interface 130 or the external device interface 135, without the tuner 110 and the demodulator 120.

Figure 3:
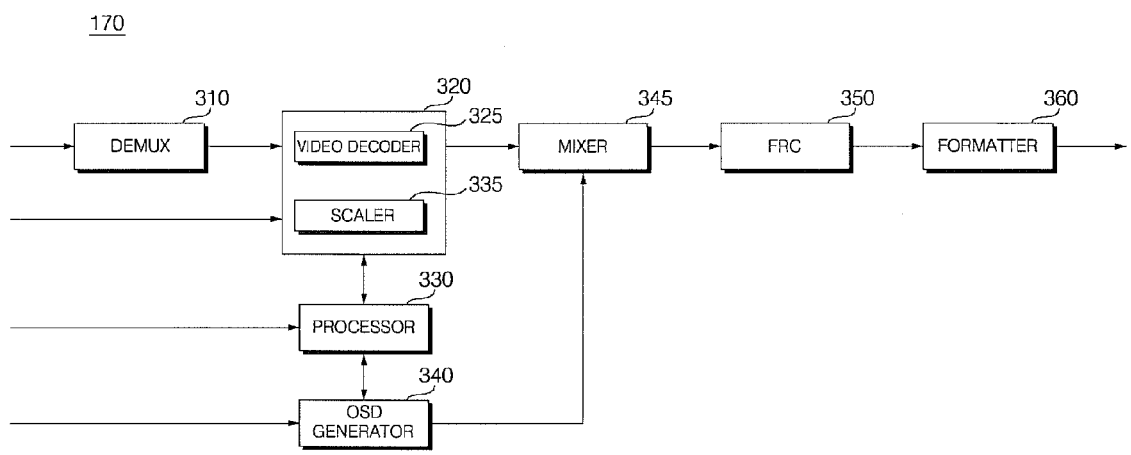
FIG. 3 is a block diagram of a controller illustrated in FIG. 2.

FIG. 3 is a block diagram of the controller illustrated in FIG. 2.

Referring to FIG. 3, the controller 170 may include a DEMUX 310, a video processor 320, a processor 330, an OSD generator 340, a mixer 350, a Frame Rate Converter (FRC) 355, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

The video signal decoded by the video processor 320 is provided to the mixer 350.

The processor 330 may provide overall control to the image display apparatus 100 or the controller 170. For example, the processor 330 may control the tuner unit 110 to tune to RF broadcasting corresponding to a user-selected channel or a pre-stored channel.

The processor 330 may also control the image display apparatus 100 according to a user command received through the user input interface 150 or an internal program.

The processor 330 may control data transmission through the network interface 130 or the external device interface 135.

The processor 330 may control operations of the DEMUX 310, the video processor 320, and the OSD generator 340 in the controller 170.

The OSD generator 340 generates an OSD signal autonomously or according to user input. For example, the OSD generator 340 may generate signals by which a variety of information is displayed as images or text on the display 180, according to user input signals or control signals. The OSD signal may include various data such as a UI screen, a variety of menu screens, widgets, icons, etc.

For example, the OSD generator 340 may generate a signal by which captions are displayed for a broadcast image or EPG-based broadcasting information.

Considering that the OSD generator 340 generates an OSD signal or a graphic signal, the OSD generator 340 may be referred to as a graphic processor.

The mixer 350 may mix the decoded video signal received from the video processor 220 with the OSD signal received from the OSD generator 340 and output the mixed signal to the formatter 360. As the decoded broadcast video signal or the external input signal is mixed with the OSD signal, an OSD may be overlaid on the broadcast image or the external input image.

The FRC 355 may change the frame rate of an input image. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The formatter 360 may change the format of a 3D video signal or convert a 2D image to a 3D image.

The audio processor (not shown) of the controller 170 may process the demultiplexed audio signal. For audio signal processing, the audio processor may have a plurality of decoders.

The audio processor of the controller 170 may also adjust the bass, treble or volume of the audio signal.

The data processor (not shown) of the controller 170 may process the data signal obtained by demultiplexing the input stream signal. For example, if the data signal is an encoded signal, the data processor may decode the data signal. The coded data signal may be an EPG which includes broadcast information specifying the start time, end time, etc. of scheduled broadcast TV or radio programs.

The block diagram of the controller 170 illustrated in FIG. 3 is an embodiment of the present invention. Depending upon the specifications of the controller 170, the components of the controller 170 may be combined, or omitted. Or new components are added to the controller 170.

Particularly, the FRC 350 and the formatter 360 may be configured separately outside the controller 170.

Figure 4:
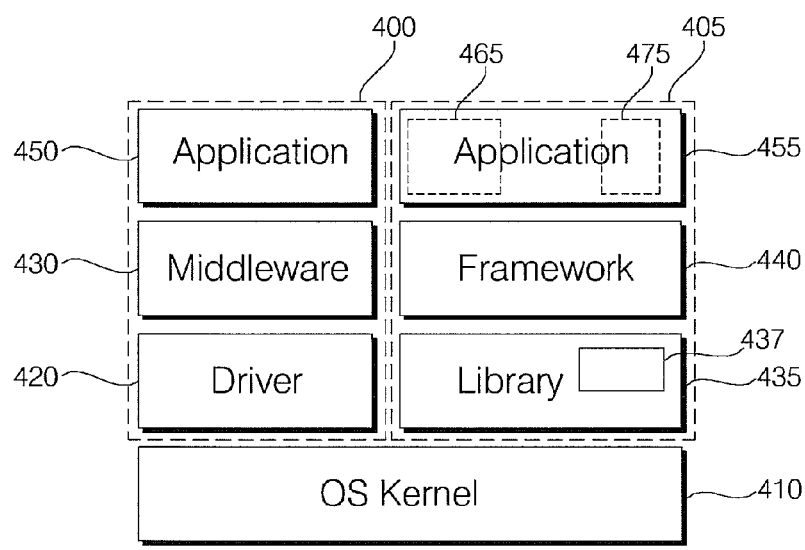
FIGS. 4 and 5 illustrate exemplary smart system platform architectures for the image display apparatus illustrated in FIG. 2.
Figure 5:
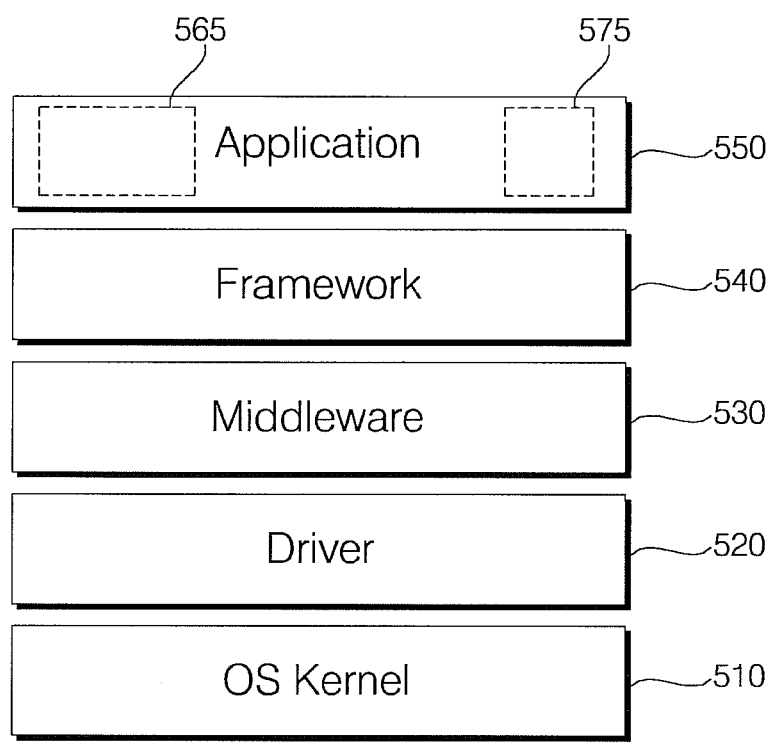

FIGS. 4 and 5 illustrate exemplary platform architectures for the image display apparatus illustrated in FIG. 2.

A platform for the image display apparatus 100 may have OS-based software to implement the above-described various operations according to an embodiment of the present invention.

Referring to FIG. 4, a platform for the image display apparatus 100 is a separate type according to an embodiment of the present invention. The platform may be designed separately as a legacy system platform 400 and a smart system platform 405. An OS kernel 410 may be shared between the legacy system platform 400 and the smart system platform 405.

The legacy system platform 400 may include a stack of a driver 420, middleware 430, and an application layer 450 on the OS kernel 410. On the other hand, the smart system platform 405 may include a stack of a library 435, a framework 440, and an application layer 455 on the OS kernel 410.

The OS kernel 410 is the core of an OS. When the image display apparatus 100 is driven, the OS kernel 410 may be responsible for operation of at least one of hardware drivers, security protection for hardware and processors in the image display apparatus 100, efficient management of system resources, memory management, hardware interfacing by hardware abstraction, multi-processing, or scheduling associated with the multi-processing. Meanwhile, the OS kernel 410 may further perform power management.

The hardware drivers of the OS kernel 410 may include, for example, at least one of a display driver, a Wireless Fidelity (Wi-Fi) driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver. The block device driver may need a buffer for buffering data on a unit basis, because data is transmitted in blocks. The character device driver may not need a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel which can be implemented in other electronic devices.

The driver 420 is interposed between the OS kernel 410 and the middleware 430. Along with the middleware 430, the driver 420 drives devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410.

In addition, the driver 420 may further include a driver for the remote controller 200, especially a 3D pointing device to be described below. The 3D pointing device driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the image display apparatus 100. The application layer 450 may allow editing and updating over a network by user selection. With use of the application layer 450, the user may enter a desired menu among various UIs by manipulating the remote controller 210 while viewing a broadcast program.

The application layer 450 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include an activity manager related to activities of applications, a notification manager, and a CP for abstracting common information between applications. This framework 440 may be written in Java.

The application layer 455 above the framework 440 includes a variety of programs that are executed and displayed in the image display apparatus 100. The application layer 455 may include, for example, a core application that is a suit having at least one solution of e-mail, Short Message Service (SMS), calendar, map, or browser. The application layer 455 may be written in Java.

In the application layer 455, applications may be categorized into user-undeletable applications 465 stored in the image display apparatus 100 that cannot be modified and user-installable or user-deletable applications 475 that are downloaded from an external device or a network and stored in the image display apparatus 100.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 5, a platform for the image display apparatus 100 according to another embodiment of the present invention is an integrated type. The integrated platform may include an OS kernel 510, a driver 520, middleware 530, a framework 540, and an application layer 550.

Compared to the separate-type platform illustrated in FIG. 4, the integrated-type platform is characterized by the absence of the library 435 and the application layer 550 being an integrated layer. The driver 520 and the framework 540 correspond to the driver 420 and the framework 440 of FIG. 4, respectively.

The library 435 of FIG. 4 may be incorporated into the middleware 530. That is, the middleware 530 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, whereas the image display system middleware includes SSL as a security-related library, WebKit as a Web engine-related library, libc, and Media Framework as a media-related library. The middleware 530 may further include the afore-described runtime.

The application layer 550 may, include a menu-related application, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus 100 and user-installable or user-deletable applications 575 that are downloaded from an external device or a network and stored in the image display apparatus 100.

The platforms illustrated in FIGS. 4 and 5 may be general-purpose ones that can be implemented in many other electronic devices as well as in image display apparatus.

The platforms illustrated in FIGS. 4 and 5 may be stored or loaded in the memory 140, the controller 170, or any other processor (not shown).

Figure 6:
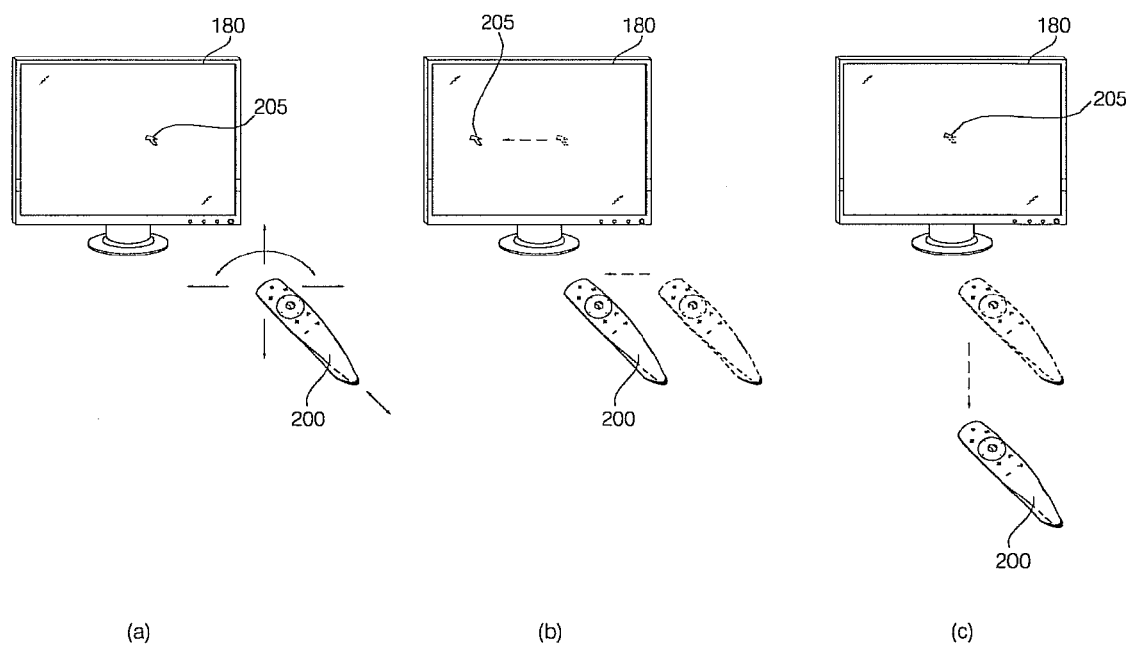
FIG. 6 illustrates a method for controlling a remote controller illustrated in FIG. 2.

FIG. 6 illustrates a method for controlling the remote controller illustrated in FIG. 2.

FIG. 6(*a*) illustrates a pointer 205 representing movement of the remote controller 200 displayed on the display 180.

The user may move or rotate the remote controller 200 up and down, side to side (FIG. 6(*b*)), and back and forth (FIG. 6(*c*)). Since the pointer 205 moves in accordance with the movement of the remote controller 200 in 3D space, the remote controller 200 may be referred to as a pointing device or 3D pointing device.

Referring to FIG. 6(*b*), if the user moves the remote controller 200 to the left, the pointer 205 also moves to the left on the display 180.

A sensor of the remote controller 200 detects the movement of the remote controller 200 and transmits motion information corresponding to the result of the detection to the image display apparatus 100. Then, the image display apparatus 100 determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus 100 then displays the pointer 205 at the calculated coordinates.

Referring to FIG. 6(*c*), while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180.

The opposite case is also possible. That is, when the remote controller 200 recedes from the display 180, the selection area may be zoomed out and when the remote controller 200 approaches the display 180, the selection area may be zoomed in.

With the predetermined button pressed on the remote controller 200, the up, down, left and right movements of the remote controller 200 may be ignored. That is, when the remote controller 200 recedes from or advances toward the display 180, only the back and forth movements of the remote controller 200 may be sensed, while the up, down, left and right movements of the remote controller 200 may be ignored. Unless the predetermined button is pressed in the remote controller 200, the pointer 205 may move in accordance with the up, down, left or right movement of the remote controller 200.

The speed and direction of the pointer 205 may correspond to the speed and direction of the remote controller 200.

Figure 7:
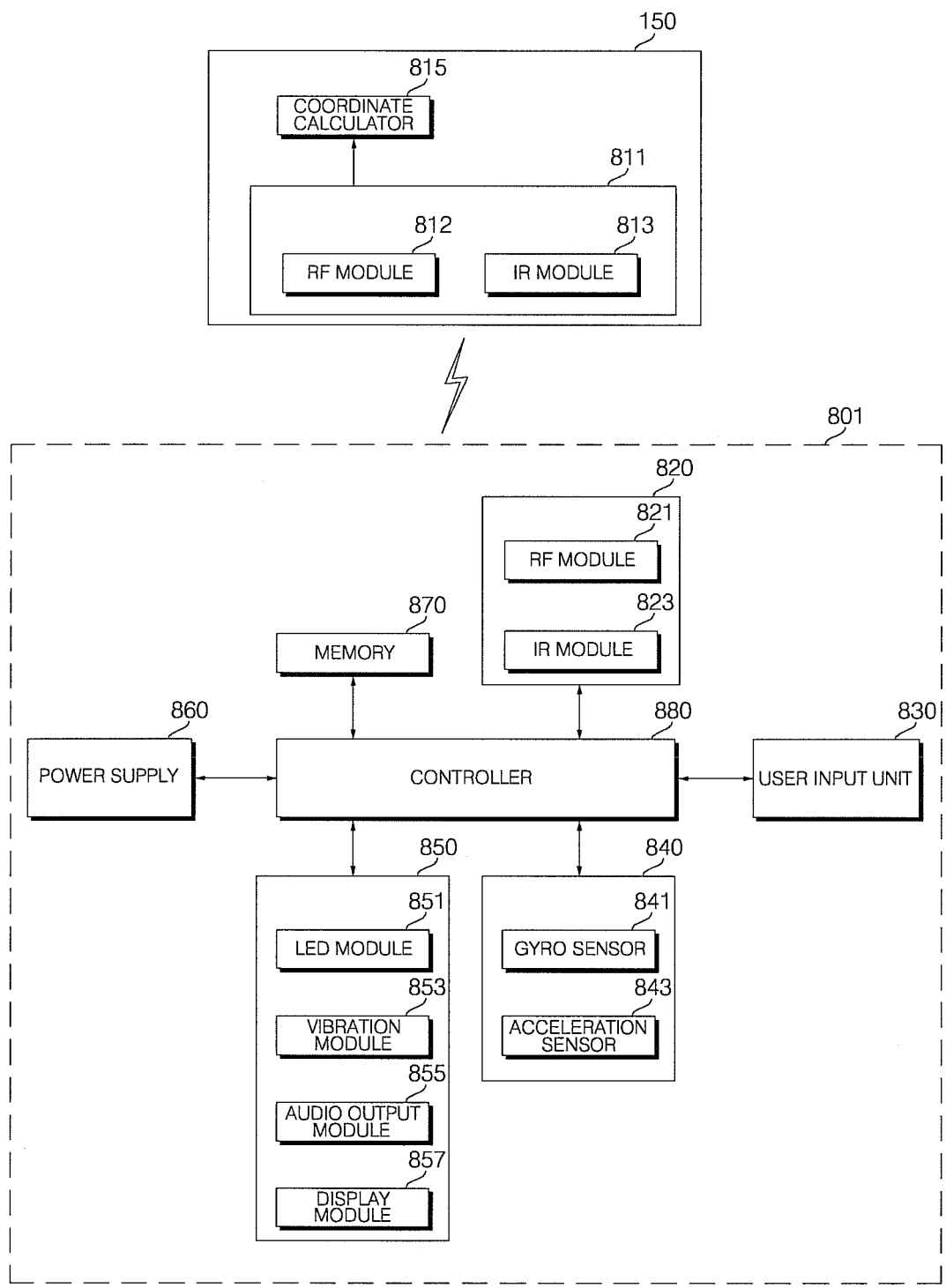
FIG. 7 is a block diagram of the remote controller illustrated in FIG. 2.

FIG. 7 is a block diagram of the remote controller illustrated in FIG. 2.

Referring to FIG. 7, the remote controller 200 may include a wireless communication module 820, a user input unit 830, a sensor unit 840, an output unit 850, a power supply 860, a memory 870, and a controller 880.

The wireless communication module 820 transmits signals to and receives signals from one of the afore-described image display apparatuses according to embodiments of the present invention. The following description will be given in the context of the image display apparatus 100.

In the embodiment of the present invention, the wireless communication module 820 may include an RF module 821 for transmitting RF signals to and/or receiving RF signals from the image display apparatus 100 according to an RF communication standard. The wireless communication module 820 may also include an IR module 823 for transmitting IR signals to and/or receiving IR signals from the image display apparatus 100 according to an IR communication standard.

The remote controller 200 may transmit motion information regarding its movement to the image display apparatus 100 through the RF module 821.

The remote controller 200 may also receive signals from the image display apparatus 100 through the RF module 821. The remote controller 200 may transmit commands, such as a power on/off command, a channel switching command, or a sound volume change command, to the image display apparatus 100 through the IR module 823, as needed.

The user input unit 830 may include a keypad, a plurality of buttons, a touch pad, and/or a touch screen. The user may enter commands to the image display apparatus 100 by manipulating the user input unit 830. If the user input unit 830 includes a plurality of hard-key buttons, the user may input various commands to the image display apparatus 100 by pressing the hard-key buttons. Alternatively or additionally, if the user input unit 830 includes a touch screen displaying a plurality of soft keys, the user may input various commands to the image display apparatus 100 by touching the soft keys. The user input unit 830 may also include various input tools other than those set forth herein, such as a wheel key, a scroll key and/or a jog key, which should not be construed as limiting the present invention.

The sensor unit 840 may include a gyro sensor 841 and/or an acceleration sensor 843. The gyro sensor 841 may sense the movement of the remote controller 200

For example, the gyro sensor 841 may sense the movement of the remote controller 200, for example, in X-, Y-, and Z-axis directions, and the acceleration sensor 843 may sense the moving speed of the remote controller 200. The sensor unit 840 may further include a distance sensor for sensing the distance between the remote controller 200 and the display 180.

The output unit 850 may output a video and/or audio signal corresponding to a manipulation of the user input unit 830 or a signal transmitted by the image display apparatus 100. The user may easily identify whether the user input unit 830 has been manipulated or whether the image display apparatus 100 has been controlled based on the video and/or audio signal output from the output unit 850.

The output unit 850 may include a Light Emitting Diode (LED) module 851 which is turned on or off whenever the user input unit 830 is manipulated or whenever a signal is received from or transmitted to the image display apparatus 100 through the wireless communication module 820, a vibration module 853 which generates vibrations, an audio output module 855 which outputs audio data, and a display module 857 which outputs an image.

The power supply 860 supplies power to the remote controller 200. If the remote controller 200 is kept stationary for a predetermined time or longer, the power supply 860 may, for example, reduce or cut off supply of power to the remote controller 200 in order to save power. The power supply 860 may resume supply of power if a specific key on the remote controller 200 is manipulated.

The memory 870 may store various programs and application data for controlling or operating the remote controller 200. The remote controller 200 may wirelessly transmit signals to and/or receive signals from the image display apparatus 100 in a predetermined frequency band through the RF module 821. The controller 880 of the remote controller 200 may store information regarding the frequency band used for the remote controller 200 to wirelessly transmit signals to and/or wirelessly receive signals from the paired image display apparatus 100 in the memory 870 and may then refer to this information for use at a later time.

The controller 880 provides overall control to the remote controller 200. For example, the controller 280 may transmit a signal corresponding to a key manipulation detected from the user input unit 830 or a signal corresponding to motion of the remote controller 200, as sensed by the sensor unit 840, to the image display apparatus 100 through the wireless communication module 820.

Figure 8:
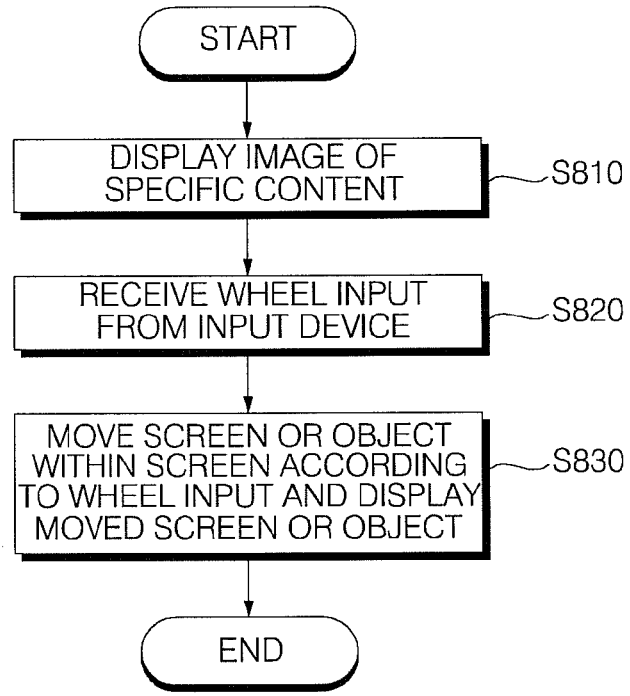
FIG. 8 is a flowchart illustrating a method for operating the image display apparatus according to an embodiment of the present invention.

FIG. 8 is a flowchart illustrating a method for operating the image display apparatus according to an embodiment of the present invention and FIGS. 9A to 11D are views referred to for describing the method for operating the image display apparatus illustrated in FIG. 8.

Referring to FIG. 8, the image display apparatus 100 displays an image of specific content (S810). The controller 170 may control display of a content image according to a user input.

For example, it is possible to display various content images including a broadcast image received through the broadcasting receiver 105, an image stored in the memory 140, a menu image generated from the OSD generator 340, an external input image received through the external device interface 135, a Web page received through the network interface 130, etc.

Subsequently, the image display apparatus 100 receives a wheel input from an input device (S820) and moves a screen or an object within the screen according to the wheel input (S830).

The user input interface 150 may receive a wheel input from the remote controller 200 or the external device interface 135 may receive a wheel input from the mouse 300.

The controller 170 controls movement of a displayed screen or an object within the screen and display of the screen or the object at a moved position.

The distance for which the screen or the object moves may vary with content types.

For example, upon receipt of a wheel input from the first input device 200 while displaying a Web page or a game screen, the image display apparatus 100 may provide a first movement distance. Upon receipt of a wheel input from the first input device 200 while displaying a setting screen, the image display apparatus 100 may provide a second movement distance shorter than the first movement distance.

Since a wheel input-based movement distance is differentiated according to the type of displayed content in this manner, user convenience can be increased.

Figure 9A:
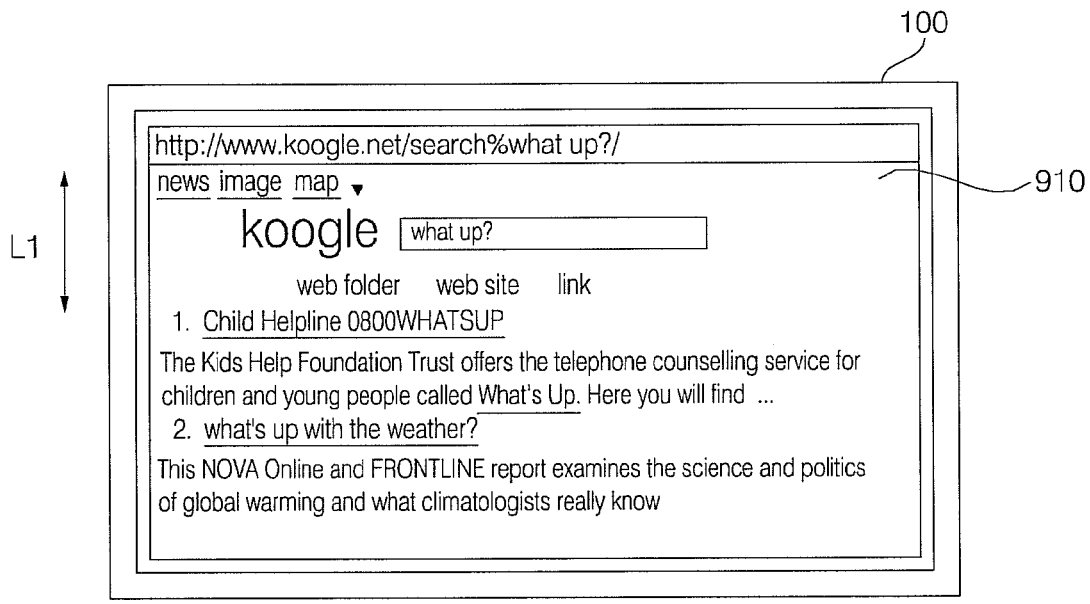
FIGS. 9A to 11D are views referred to for describing the method for operating the image display apparatus illustrated in FIG. 8.

FIG. 9A illustrates exemplary display of a Web page 910 in the image display apparatus 100. The Web page 910 may be based on Web data received from a Web server through the network interface 130.

When a wheel input is generated through manipulation of the wheel 201 of the remote controller 200, a Web page 912 scrolled from the Web page 910 by a specific distance may be displayed in the image display apparatus 100, as illustrated in FIG. 9B. It is noted that the Web page 912 appears by scrolling up the Web page 910 illustrated in FIG. 9A by a first movement distance L1.

Figure 9C:
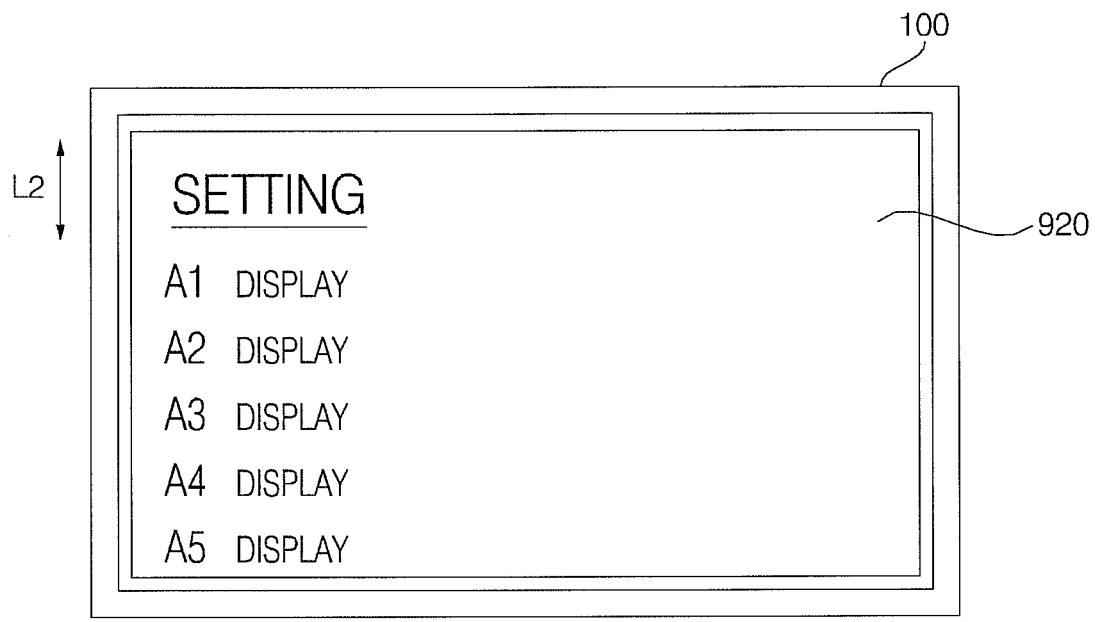

FIG. 9C illustrates exemplary display of a setting screen 920 in the image display apparatus 100. The setting screen 920 may be generated from the OSD generator 340 of the controller 170.

Figure 9D:
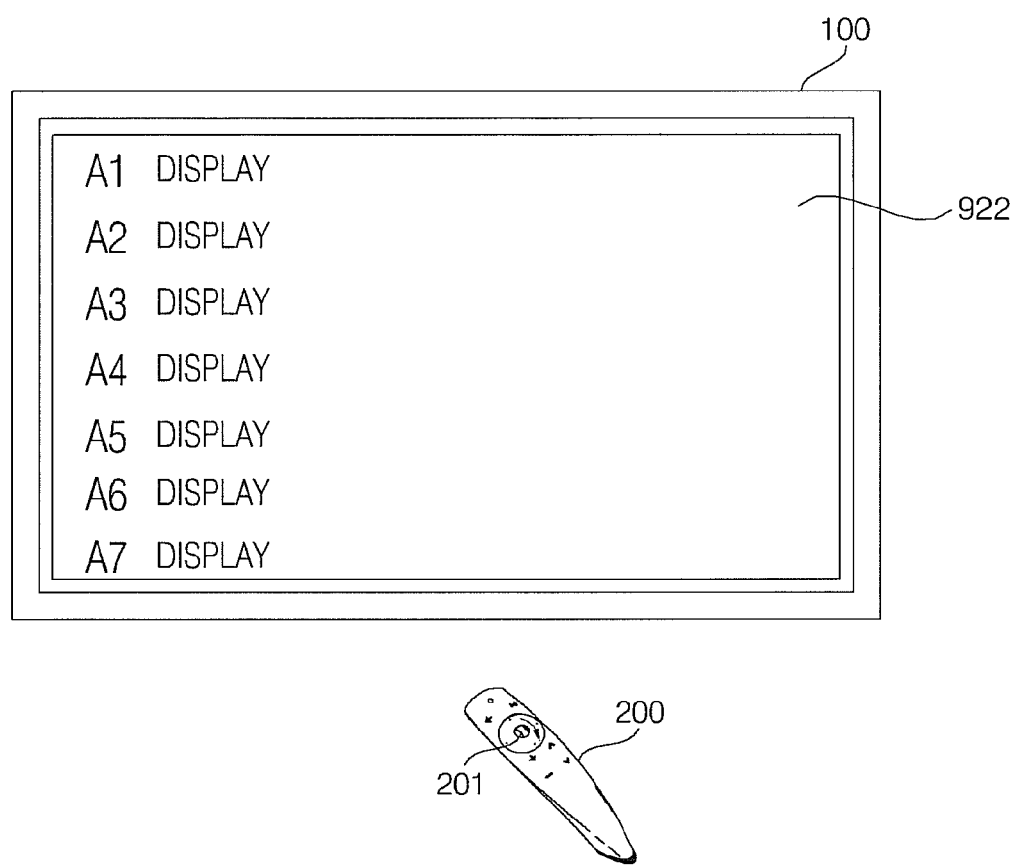

When a wheel input is generated through manipulation of the wheel 201 of the remote controller 200, a setting screen 922 scrolled from the setting screen 920 by a specific distance may be displayed in the image display apparatus 100, as illustrated in FIG. 9D. It is noted that the setting screen 922 appears by scrolling up the setting screen 920 illustrated in FIG. 9C by a second movement distance L2.

The first and second movement distances are per-wheel event movement distances. For example, the first and second movement distances may be set to 6 cm per tick and 1cm per tick, respectively.

For a Web page or game screen requiring fast scroll, a large wheel input-based movement distance, that is, a large wheel sensitivity (i.e. highly sensitive) may be set. On the other hand, a small wheel input-based movement distance, that is, a small wheel sensitivity (i.e. insensitive) may be set for a setting screen requiring fine scroll.

As a wheel input-based movement distance varies with the type of displayed content in this manner, user convenience can be increased.

Figure 10A:
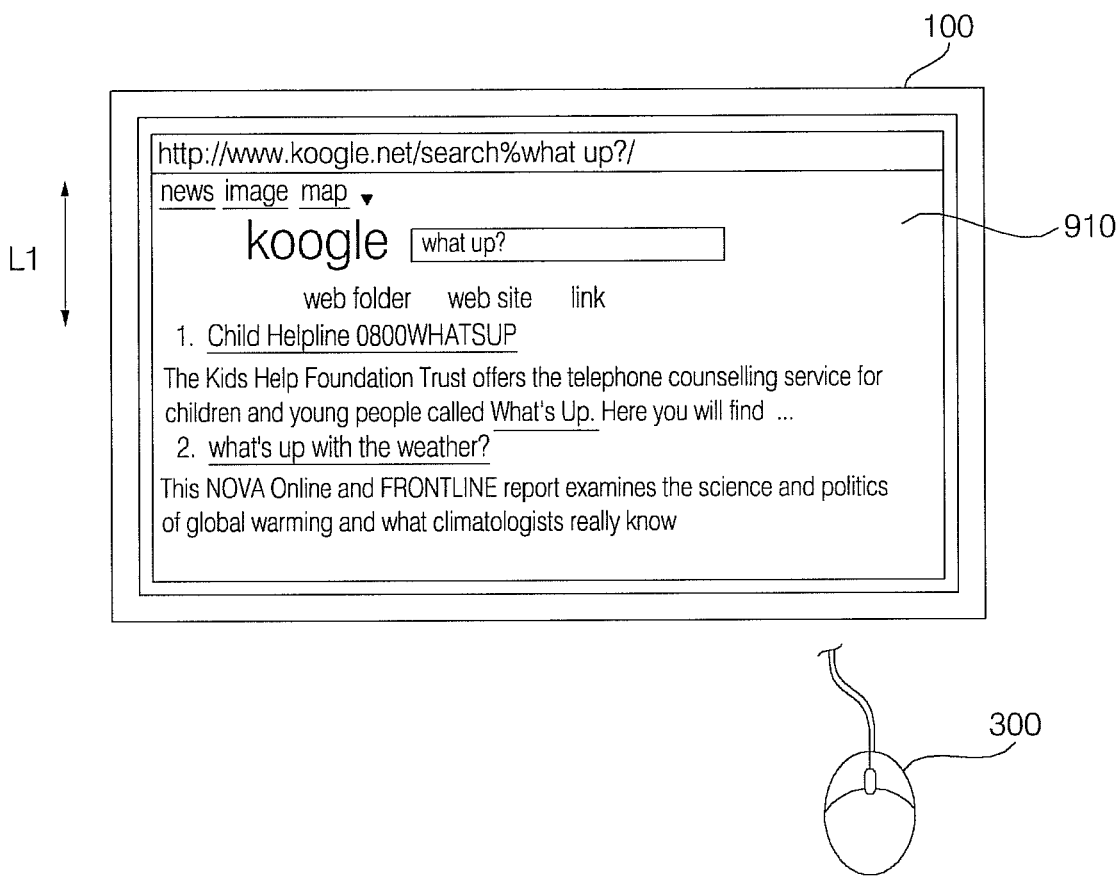

FIGS. 10A and 10B illustrate an exemplary case where a wheel input is received from a mouse.

FIG. 10A illustrates exemplary display of a Web page 1010 in the image display apparatus 100. When a wheel input is generated through manipulation of the wheel 301 of the mouse 300, a Web page 1012 scrolled from the Web page 1010 by a specific distance may be displayed in the image display apparatus 100, as illustrated in FIG. 10B. It is noted that the Web page 1012 appears by scrolling up the Web page 1010 illustrated in FIG. 10A by the first movement distance L1.

A comparison between FIGS. 10A and 10B and FIGS. 9A and 9B reveals that the same movement distance per wheel input is provided for the different input devices, that is, the remote controller 200 and the mouse 300.

The controller 170 may set the same movement distance, that is, the same wheel sensitivity for the same content image despite wheel input from different input devices.

For example, the remote controller may create a smaller number of ticks than the mouse in view of the mechanical characteristics and operation mechanisms of the wheels of the remote controller and the mouse. That is, the remote controller and the mouse may differ in the amount of an event per tick. In this case, the user may adjust wheel sensitivity manually using a wheel sensitivity control menu each time the user uses each input device.

In accordance with an embodiment of the present invention, the same movement distance is provided for the same content image, when different input devices such as a remote controller and a mouse are used. Accordingly, user convenience can be increased.

Meanwhile, different wheel sensitivities may be created for the same type of input devices due to their physical differences. That is, since first and second remote controllers may differ in wheel sensitivity, the same movement distance is provided for the same content image, upon receipt of wheel inputs from the first and second remote controllers in the embodiment of the present invention.

FIGS. 11A to 11D illustrate exemplary cases where a screen or an object within a screen moves for a different distance according to the magnification or resolution of a displayed content image.

Figure 11A:
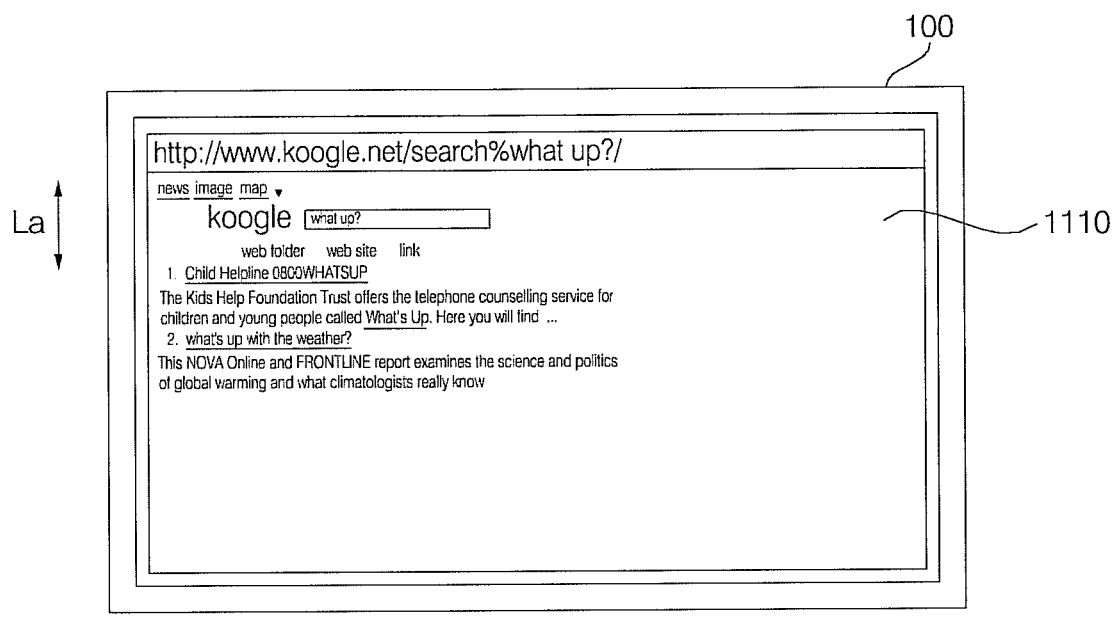

FIG. 11A illustrates display of a Web page 1110 having a first magnification in the image display apparatus 100. When a wheel input is generated through manipulation of the wheel 201 of the remote controller 200, a Web page 1112 scrolled from the Web page 1110 by a specific distance may be displayed as illustrated in FIG. 11B. A comparison between FIGS. 11A and 11B reveals that the specific distance is La.

Figure 11C:
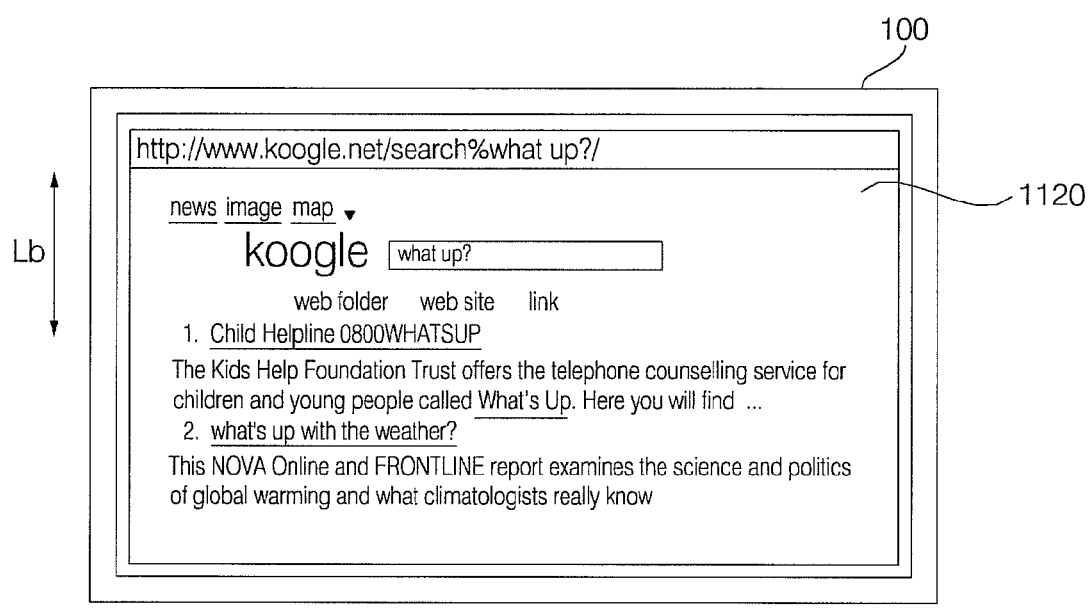

FIG. 11C illustrates display of a Web page 1120 having a second magnification larger than the first magnification in the image display apparatus 100. When a wheel input is generated through manipulation of the wheel 201 of the remote controller 200, a Web page 1122 scrolled from the Web page 1120 by a specific distance may be displayed as illustrated in FIG. 11D. A comparison between FIGS. 11C and 11D reveals that the specific distance is Lb larger than La.

As described above, even though the same content is displayed, a screen or an object within a screen may move for a different distance depending on the magnification or resolution of the displayed content. Since an appropriate movement distance is provided according to a screen magnification or resolution, user convenience can be increased.

Figure 12:
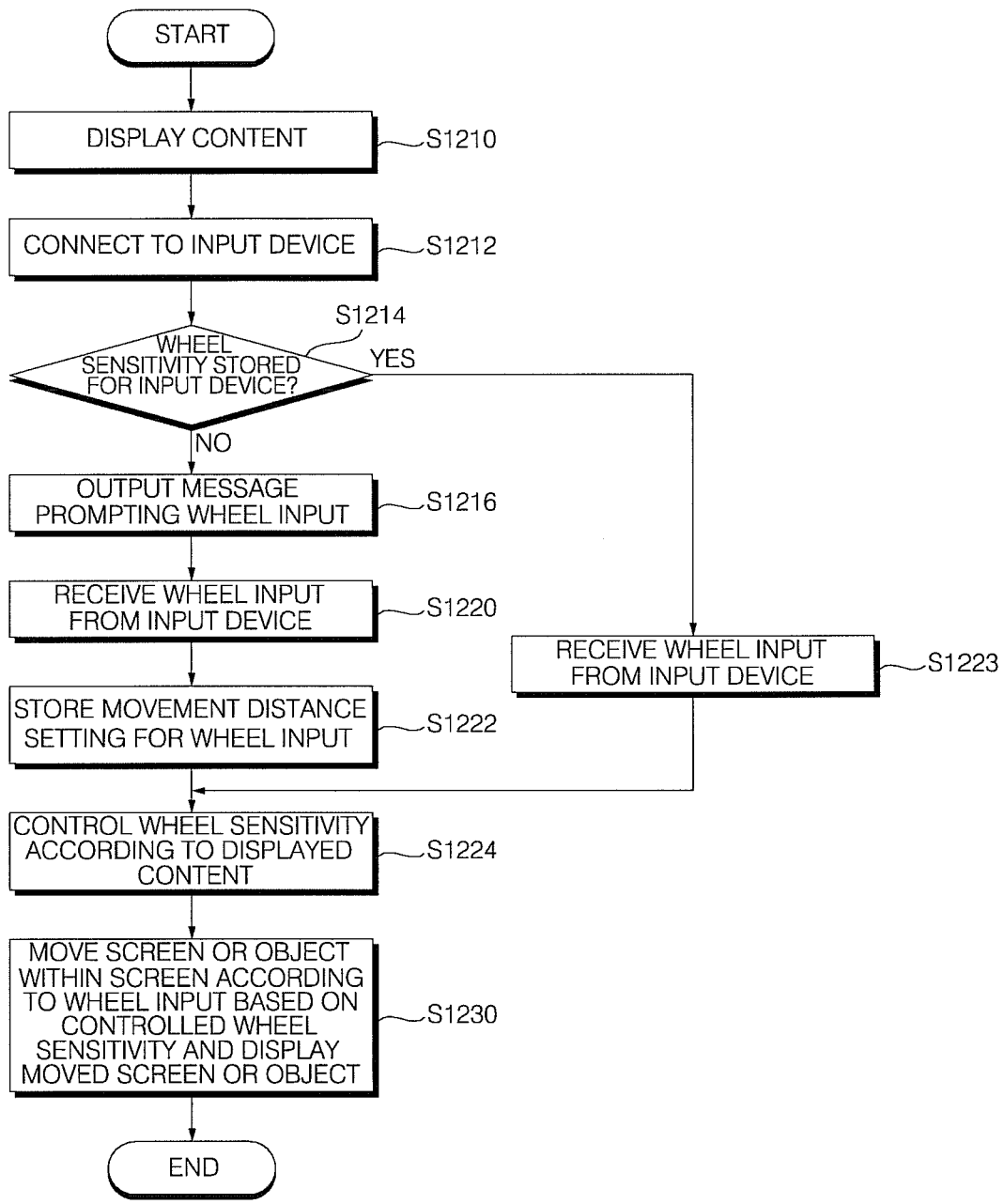
FIG. 12 is a flowchart illustrating a method for operating the image display apparatus according to another embodiment of the present invention.
Figure 13:
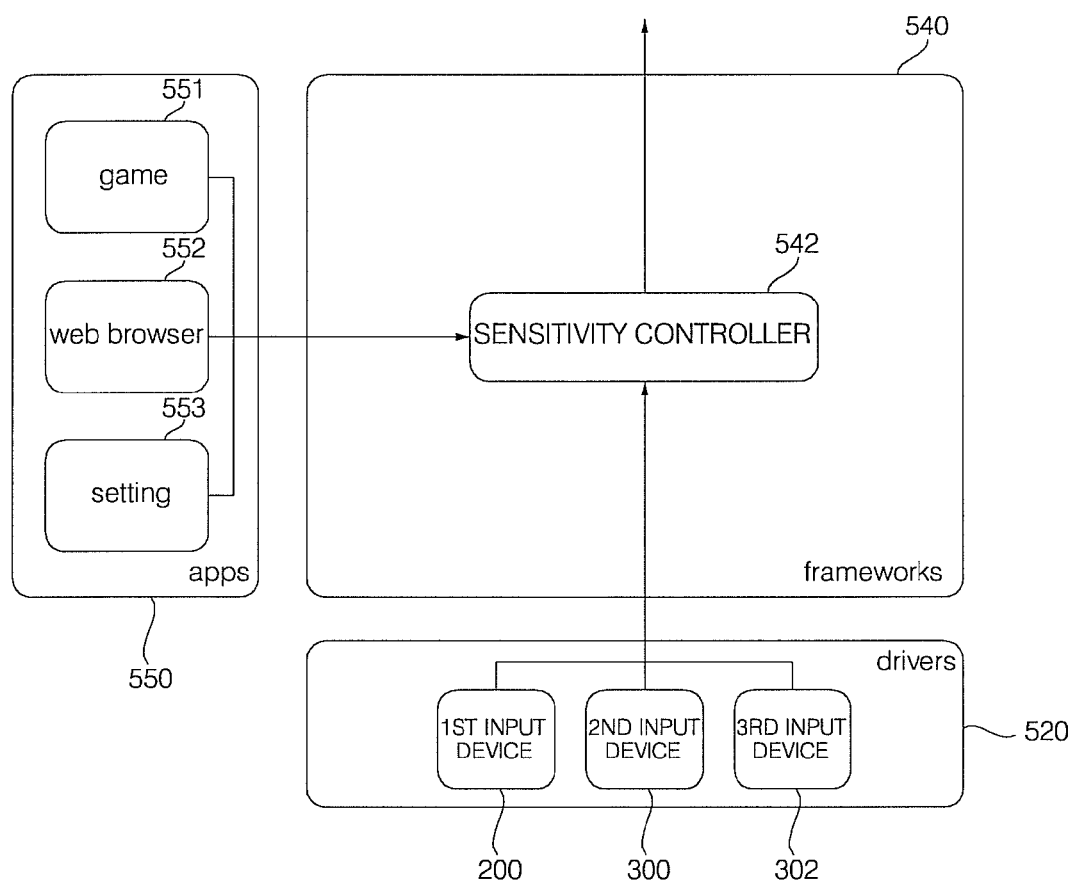

FIG. 12 is a flowchart illustrating a method for operating the image display apparatus according to another embodiment of the present invention, and FIGS. 13 to 14E are views referred to for describing the method for operating the image display apparatus illustrated in FIG. 12.

Referring to FIG. 12, the image display apparatus 100 displays an image of specific content (S1210). The controller 170 may control display of a content image according to a user input.

For example, it is possible to display various content images including a broadcast image received through the broadcasting receiver 105, an image stored in the memory 140, a menu image generated from the OSD generator 340, an external input image received through the external device interface 135, a Web page received through the network interface 130, etc.

Subsequently, the image display apparatus 100 is connected to an input device (S1212). For example, when the input device is the remote controller 200, the image display apparatus 100 and the remote controller 200 exchange a pairing signal and a pairing response signal with each other. Then a specific radio channel is allocated between the image display apparatus 100 and the remote controller 200 so that they may be connected.

In another example, when the input device is the mouse 300, the image display apparatus 100 and the mouse 300 may exchange a pairing signal and a pairing response signal with each other and thus may be connected.

The controller 170 determines whether information about the wheel sensitivity of the connected input device is stored (S1214). In the absence of the information about the wheel sensitivity of the connected input device, a message prompting a wheel input is output (S1216). Then a wheel input is received from the input device (S1220) and a movement distance setting for the wheel input is stored (S1222).

The controller 170 determines whether the information about the wheel sensitivity of the connected input device is stored in the memory 140. The wheel sensitivity may represent the amount of an event per unit wheel input, that is, a movement distance per unit wheel input.

For example, the memory 140 may store a first wheel sensitivity for a first remote controller and a second wheel sensitivity for a second remote controller.

Meanwhile, the memory 140 may store information about a wheel sensitivity for each input device type. That is, the memory 140 may store a wheel sensitivity for a remote controller and a wheel sensitivity for a mouse.

In the absence of the information about the wheel sensitivity in the memory 140, the controller 170 may control output of a message prompting a wheel input. Upon receipt of a wheel input from the input device, the controller 170 stores a wheel sensitivity, that is, a movement distance for the wheel input in the memory 140.

In the presence of the information about the wheel sensitivity in step S1214, the controller 170 may receive a wheel input from the input device without outputting any message (S1223).

The controller 170 controls the wheel sensitivity according to displayed content (S1224) and moves a screen or an object within the screen according to the controlled wheel sensitivity (S1230).

The controller 170 determines the type of displayed content. Specifically, the controller 170 may determine the type of the displayed content based on file property information included in a content file related to the displayed content.

The controller 170 controls the wheel sensitivity according to the determined content type and controls movement of a screen or an object within the screen according to the controlled wheel sensitivity.

For example, upon receipt of a wheel input from the first input device 200 while displaying a Web page or a game screen, the image display apparatus 100 may provide the first movement distance. Upon receipt of a wheel input from the first input device 200 while displaying a setting screen, the image display apparatus 100 may provide the second movement distance shorter than the first movement distance.

FIG. 13 illustrates sensitivity control according to a wheel input in the platform of the image display apparatus 100.

Referring to FIG. 13, a wheel sensitivity controller 542 for controlling a wheel sensitivity may be provided in the framework 540.

In the integrated-type platform of the image display apparatus 100 described before with reference to FIG. 5, drivers may be installed for input devices 200, 300 and 302 in the driver 520. Applications 551, 552 and 553 installed in the image display apparatus 100 may reside in the application layer 550.

For example, when the user executes the Web application 552 and generates a when input using the first input device 200, the sensitivity controller 542 of the framework 540 controls a wheel sensitivity, taking into account a content type, that is, the Web application 552. As described before, the wheel sensitivity may be controlled so as to set the first movement distance L1.

In another example, when the user executes the setting application 553 and generates a when input using the first input device 200, the sensitivity controller 542 of the framework 540 controls a wheel sensitivity, taking into account a content type, that is, the Web application 552, and the first input device 200. As described before, the wheel sensitivity may be controlled so as to set the second movement distance L2.

In a further example, when the user executes the Web application 552 and generates a when input using the second input device 300, the sensitivity controller 542 of the framework 540 controls a wheel sensitivity, taking into account a content type, that is, the Web application 552, and the second input device 300. As described before, the wheel sensitivity may be controlled so as to set the first movement distance L1.

That is, the sensitivity controller 542 may control a wheel sensitivity, giving priority to the wheel sensitivity of the Web application 552 over the wheel sensitivity of the second input device 300 stored in the memory 140. Therefore, even though a different input device is used, the same wheel sensitivity may be provided for the same content.

The sensitivity controller 542 may perform sensitivity control, taking into comprehensive account the amount of an event per tick for each input device, the number of ticks generated per wheel revolution, and an intended movement distance for content.

Especially, the sensitivity controller 542 may normalize the amount of an event per tick and the number of ticks per wheel revolution, which are probable to have different values, and thus may control a wheel sensitivity according to an intended movement distance for content and the normalized values.

The controller 170 may determine a content type when executing an application, as follows.

In an example, content type information described in an application manifest file may be used.

In another example, content type information may be added to Android property and thus may be used. Specifically, property_set and property_get provided by Android may be used and property$_{13}$ set(acceleration) may be set. An intended speed such as slow, normal, and fast may be set as acceleration.

In this case, the driver 520 of the image display apparatus 100 may read a set acceleration from property_get. If the acceleration is set to slow, normal, and fast, the driver 520 may apply a 0.5-multiple, 1.0-multiple, and 2.0-multiple acceleration to a wheel value, respectively.

In a third example, an Application Programming Interface (API) for a wheel acceleration may be used by Android SDK.

FIG. 14A illustrates an exemplary home screen for the image display apparatus.

A home screen 1600 of the image display apparatus 100 may be divided into a broadcast image area 1612, a first content list area 1614, a second content list area 1616, and an application list area 1618. The pointer 205 may further be displayed, which moves in correspondence with movement of the remote controller 200.

The broadcast image area 1612 may include a SETUP item 1613 and the application list area 1618 may include a WEB item 1619.

Upon selection of the WEB item 1619 using the remote controller 200, a Web page 1610 may be displayed as illustrated in FIG. 14B.

If a movement distance setting for a wheel input from the remote controller has not been stored, a message 1620 prompting a when input from an input device may be displayed as illustrated in FIG. 14C.

Thus, when the user applies a wheel input by manipulating the wheel 201 of the remote controller 200, the controller 170 controls a wheel sensitivity according to the wheel input, particularly according to the type of content and the input device.

After the wheel sensitivity control, a wheel sensitivity control complete message 1630 may be displayed as illustrated in FIG. 14D.

Then a Web page 1612 resulting from scrolling up the Web page 1610 by the first distance L1 may be displayed according to the wheel sensitivity control in response to the wheel input, as illustrated in FIG. 14E.

As is apparent from the above description, upon receipt of a wheel input from an input device, the image display apparatus differentiates a wheel input-based movement distance according to the type of displayed content. Therefore, user convenience can be increased.

For wheel inputs from different input devices, the image display apparatus provides the same movement distance. Accordingly, a user is relieved of inconvenience with which the user might control wheel sensitivity manually each time the user uses each input device, in view of different wheel sensitivities of different input devices.

The image display apparatus and the method for operating the image display apparatus according to the foregoing exemplary embodiments are not restricted to the exemplary embodiments set forth herein. Therefore, variations and combinations of the exemplary embodiments set forth herein may fall within the scope of the present invention.

The method for operating the image display apparatus according to the foregoing exemplary embodiments may be implemented as code that can be written on a computer-readable recording medium and thus read by a processor in the portable terminal and the image display apparatus. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an image display apparatus, comprising:
   displaying an image of specific content;
   receiving a wheel input from an input device;
   moving a screen or an object within the screen according to the wheel input and displaying the moved screen or object,
   outputting a message prompting for a wheel input from the input device, when a movement distance is not pre-stored for a wheel input from the input device;
   storing a movement distance for the wheel input, upon receipt of the wheel input from the input device in response to the message, when the movement distance is not pre-stored for the wheel input from the input device,
   controlling a wheel sensitivity for a first input device; and
   controlling a wheel sensitivity for a second input device;
   wherein a distance for which the screen or the object within the screen moves according to the wheel input is changed based on a type of the displayed content, and
   wherein the wheel sensitivities of the first and second input devices are equal regardless of type of input devices for a same content image.

2. The method according to claim 1, wherein if the displayed content is first content, the distance is a first movement distance and if the displayed content is second content, the distance is a second movement distance smaller than the first movement distance.

3. The method according to claim 2, wherein an image of the first content is a Web page or a game screen and an image of the second content is a setting screen.

4. The method according to claim 1, wherein upon receipt of wheel inputs from first and second input devices while the image of the content is displayed, the screen or the object within the screen moves for the same distance according to the wheel inputs.

5. The method according to claim 1, further comprising determining the type of the displayed content.

6. The method according to claim 5, wherein the determination of the type of the displayed content comprises determining the type of the displayed content using file property information included in a content file related to the displayed content.

7. The method according to claim 1, further comprising controlling a wheel sensitivity according to the displayed content, wherein the moving and displaying comprises moving the screen or the object within the screen based on the controlled wheel sensitivity according to the wheel input and displaying the moved screen or object.

8. The method according to claim 1, wherein the distance for which the screen or the object within the screen moves according to the wheel input is further changed based on the size of the displayed content.

9. The method according to claim 1, wherein the distance for which the screen or the object within the screen moves according to the wheel input is further changed based on the magnification or resolution of the displayed image of the content.

10. An image display apparatus comprising:
    a display to display an image of specific content;
    an interface to receive a wheel input from an input device;
    a memory to store a movement distance for the wheel input, upon receipt of the wheel input from the input device, when a movement distance is not pre-stored for the wheel input from the input device; and
    a controller to control movement of a screen or an object within the screen according to the wheel input and to control display of the moved screen or object, wherein the controller changes a distance for which the screen or the object within the screen moves according to the wheel input, based on a type of the displayed content,
    wherein when the movement distance is not pre-stored for a wheel input from the input device, the display outputs a message prompting for a wheel input from the input device, and
    wherein upon receipt of wheel inputs from first and second input devices while the image of the content is displayed, the controller controls movement of the screen or the object within the screen moves for the same distance regardless of type of input devices for a same content image according to the wheel inputs and controls display of the moved screen or object.

11. The image display apparatus according to claim 10, wherein the controller determines the type of the displayed content.

12. The image display apparatus according to claim 11, wherein the controller determines the type of the displayed content using file property information included in a content file related to the displayed content.

13. The image display apparatus according to claim 10, wherein the controller controls a wheel sensitivity according to the displayed content, controls movement of the screen or the object within the screen based on the controlled wheel sensitivity according to the wheel input, and controls display of the moved screen or object.

14. The image display apparatus according to claim 10, wherein the controller changes the distance for which the screen or the object within the screen moves according to the wheel input based on the magnification or resolution of the displayed content.

* * * * *